Figure 1:
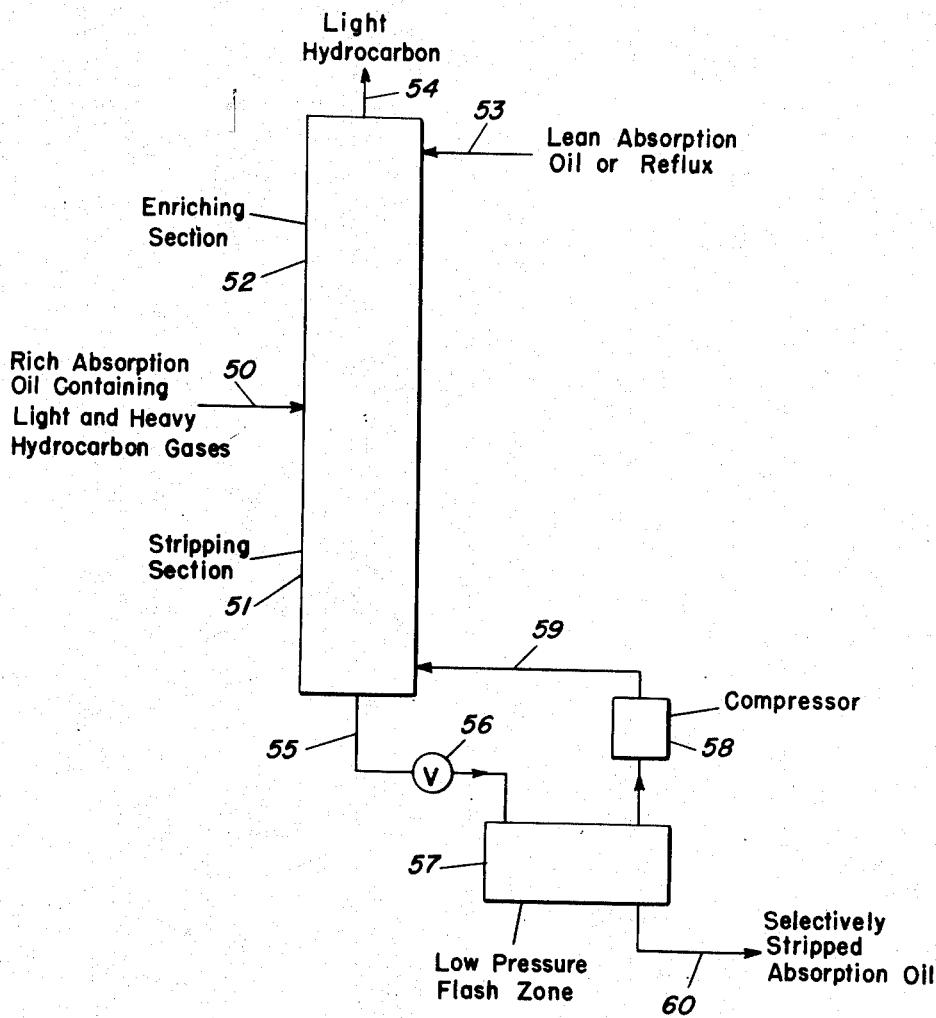

Sept. 21, 1954  W. H. DAVIS  2,689,625
ABSORPTIVE SEPARATION OF HYDROCARBON GASES
Filed April 26, 1951  2 Sheets-Sheet 1

*INVENTOR.*
WILLIAM H. DAVIS
BY
Busser and Harding
ATTORNEYS

Patented Sept. 21, 1954

2,689,625

UNITED STATES PATENT OFFICE 2,689,625

ABSORPTIVE SEPARATION OF HYDROCARBON GASES

William H. Davis, Bala Cynwyd, Pa., assignor to Sun Oil Company, Philadelphia, Pa., a corporation of New Jersey Application April 26, 1951, Serial No. 223,043

3 Claims. (Cl. 183—115)

This invention relates to the separation of gases and more particularly to an improved process for separating a relatively light hydrocarbon gas from one or more relatively heavy hydrocarbon gases.

Examples of hydrocarbon mixtures which can be advantageously separated in accordance with the invention are natural gas and refinery gases. Such gases may include methane, ethane, ethylene, propylene, propane, butylenes, butadienes, butanes, etc., as constituents.

Conventional procedure in separating the components of natural or refinery gas involves the use of an absorption step in which heavier components are, to an extent, absorbed selectively from lighter components by means of an absorption oil, followed by various stripping and rectification steps for separating the absorbed components from each other. In treating the rich absorption oil it is customary to selectively strip the lighter component or components therefrom by means of a tower which is operated in a manner to effect fractionation so as to leave heavier components dissolved in the oil. The partially stripped oil is then introduced into a second tower where the heavier absorbed components are removed. In the selective stripping step the rich oil generally is heated prior to its introduction into the tower and a conventional reboiler is provided at the base of the tower to supply additional heat for the stripping operation.

The foregoing conventional procedure in which the selective stripping is done at elevated temperature is not entirely satisfactory, for the reason that high temperature has an adverse effect upon the sharpness of fractionation between adjacent hydrocarbon components of the gas mixture. This is due to the fact that the volatility of a heavier hydrocarbon component increases more than does the volatility of a lighter hydrocarbon component as the temperature rises. For example, as temperature is increased above ordinary or normal temperatures, the volatility of methane remains substantially the same whereas the volatility of ethylene becomes greater; consequently, effective separation between these two constituents becomes more difficult at elevated temperatures. Again, in the case of ethane and propane, the volatility of ethane increases at a considerably slower rate with temperature than does the volatility of propane. Accordingly, the relative volatilities of these two hydrocarbons at 100° F. is about 2.8; but at 500° F., which is a temperature commonly employed in convenient reboiler operation, it is only about 1.6. Similar adverse decreases in relative volatilities occur for other hydrocarbon pairs as the temperature increases.

The present invention is directed to an improved process for effecting separation of hydrocarbon gases from each other. According to the invention the rich absorption oil containing relatively light and heavy hydrocarbon gases dissolved therein is passed without heating into a fractionating system in which the relatively light hydrocarbon constituent is selectively stripped from the oil and fractionated from the relatively heavy constituent without substantial addition of heat. This is accomplished by introducing the rich oil into a tower the upper portion of which constitutes a light hydrocarbon enriching section and the lower portion of which constitutes a selective stripper. Absorption oil from the base of the tower is passed into a flash zone wherein it is subjected to a reduced pressure adapted to cause partial vaporization of the absorbed gas. The vaporized gas is then compressed and returned to the lower part of the tower to serve as stripping medium for selectively removing the light hydrocarbon from the downflowing absorption oil. Relatively high temperatures in the system are thus avoided, with the result that effective fractionation between the light and heavy hydrocarbon gases is achieved.

Figure 2:
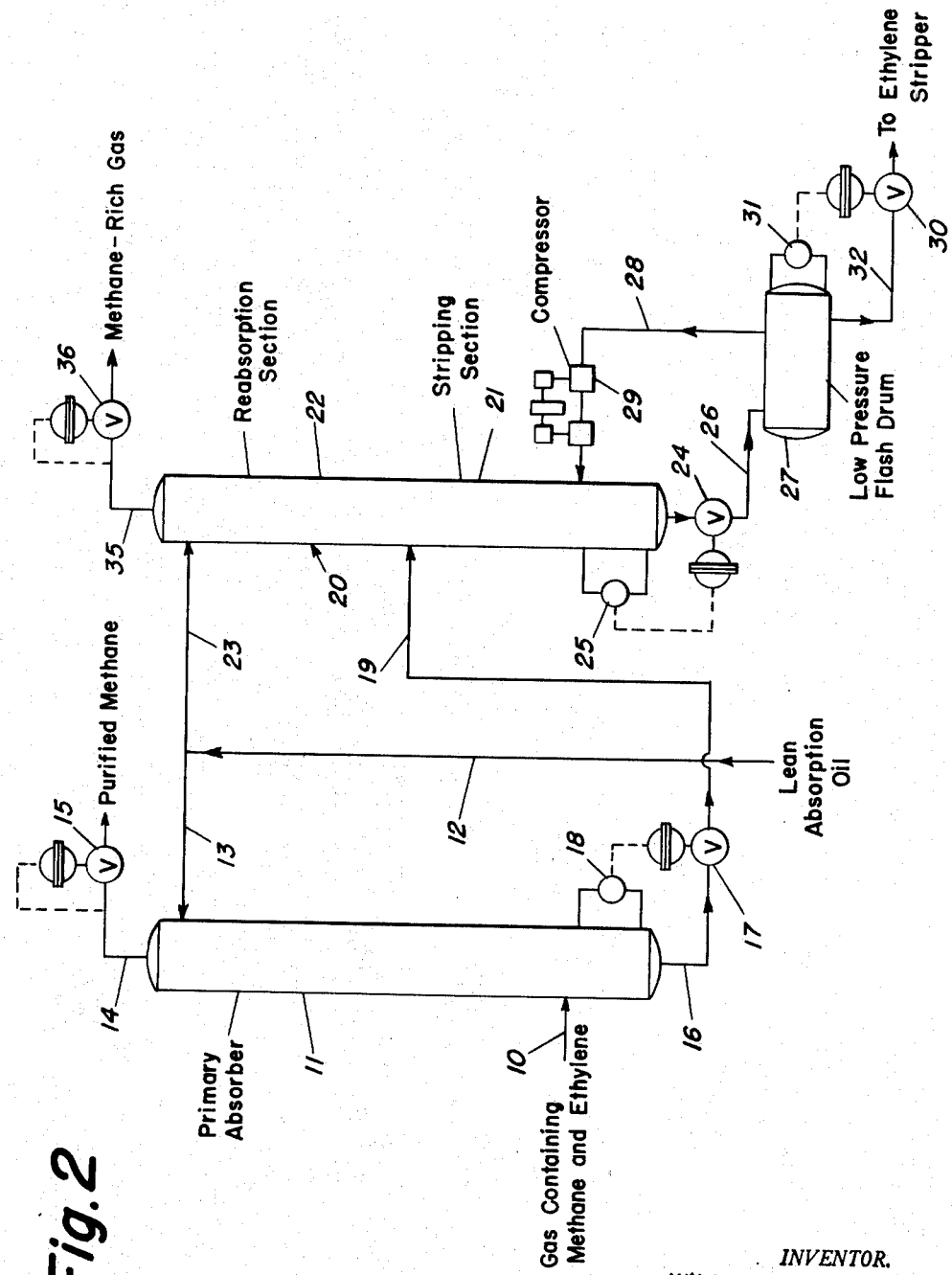

The invention is more specifically described below with reference to the accompanying drawings in which Figure 1 is a simplified illustration of the invention and Figure 2 is a diagrammatic flowsheet illustrating in more detail an arrangement of apparatus for conducting the process.

With reference to Figure 1, an absorption oil which has been used to contact a mixture of the hydrocarbon gases to be separated and which contains relatively light and heavy hydrocarbon gases dissolved therein is introduced into a tower by means of feed line 50. The lower portion of the tower constitutes a stripping section 51 for selectively stripping the light hydrocarbon from the absorption oil, while the upper portion constitutes an enriching section 52 for separating relatively heavy hydrocarbon from the light constituent. Enriching section 52 may be operated either by introducing lean absorption oil into the upper part of the tower through line 53 or by returning a portion of the purified light hydrocarbon, which is removed through line 54, through line 53 as liquid reflux.

Absorption oil which flows from the base of the tower through line 55 passes through a pressure reducing valve 56 and into a low pressure flash zone 57. A portion of the heavier hydrocarbon gas dissolved in the oil is vaporized in zone 57 essentially by reason of the reduced pressure maintained in such zone. The vaporized gas is forced by means of compressor 58 through line 59 back into stripping zone 51 wherein it serves as a stripping medium for removing the light hydrocarbon from the downflowing absorption oil. The absorption oil withdrawn from zone 57 through line 60 contains heavier hydrocarbon gas and may, if desired, be sent to one or more additional operations similar to the operation above described in order to effect further separation between the hydrocarbon gas constituents.

As a more specific illustration of the invention, the separation of methane from ethylene is described with reference to Figure 2. Charge gas containing methane and ethylene is fed through line 10 into the lower part of a primary absorber 11 and flows upwardly therethrough countercurrent to a suitable absorption medium, such as the usual absorption oil used in refinery practice, which is introduced into the upper part of the tower by means of lines 12 and 13. The charge gas comprises methane and ethylene and may or may not contain higher boiling hydrocarbon gases such as ethane, propylene, propane, butenes, butanes, etc. Operating conditions within tower 11 preferably are maintained such as to effect absorption of at least a major proportion of the ethylene present in the charge; but as a practical matter essentially complete absorption of ethylene generally will not be effected. From the top of the tower the unabsorbed gas comprising methane and usually some ethylene passes through line 14, the rate of withdrawal being controlled by back pressure control valve 15.

The rich absorption oil from the base of tower 11 flows through line 16 and valve 17 which is regulated by means of level controller 18, and is then introduced without substantial heating through line 19 into a second tower 20 at an intermediate level. The portion of tower 20 below the feed line constitutes a stripping section 21 while the upper portion constitutes an enriching zone illustrated in the drawing as a reabsorption section 22. Additional lean absorption oil is fed by means of lines 12 and 23 into the upper part of the reabsorption section and flows downwardly therein to selectively absorb ethylene from upflowing methane. From the top of the tower, gas which is rich in methane is withdrawn through line 35 and back pressure valve 36. If the operating conditions are such that this gas contains substantial amounts of ethylene due to lack of sufficient fractionation in the reabsorption section 22, the gas may be recycled to the primary absorber for reprocessing along with the charge gas.

From the base of tower 20 partially stripped absorption oil is removed through pressure reducing valve 24 at a rate regulated by level controller 25 and passes through line 26 into a low pressure flash drum 27. Partial vaporization of the absorbed gas occurs within flash drum 27 essentially by reason of the reduced pressure and without substantial application of heat. The vaporized gas flows through line 28 to compressor 29 wherein it is raised sufficiently in pressure for reintroduction into the lower part of stripping section 21. The returned gas thus acts as stripping medium for selectively removing methane from the downflowing absorption oil. The amount of gas recycled in this manner is so regulated by means of compressor 29 as to achieve the desired degree of stripping of the absorption oil before it leaves the base of the tower.

Absorption oil containing dissolved ethylene is removed from flash drum 27 by means of valve 30 and controller 31 through line 32, and may then be subjected to additional stripping and fractionating operations (not shown), similar to that conducted in column 20, for separating the other gaseous constituents from each other.

It is not absolutely necessary, for securing advantages of the invention, that addition of heat to the rich absorption oil in line 19 of Figure 2 or at flash drum 27 be entirely avoided, but it is important that the temperature in column 20 be maintained at a relatively low level. Mild heat addition in some instances may be desirable to avoid sub-normal temperatures that may give rise to certain operating difficulties. For example, since the flashing operation in drum 27 results in a temperature decrease due to vaporization of absorbed gas, the temperature in the flash zone may drop considerably below normal room temperature and might even become so low as to cause any water that may be present in the absorption oil mixture to freeze. In such case it would be advantageous to add enough heat at the flash zone to avoid the undesirably low temperature. The amount of heat added in any event should be insufficient to raise the temperature in column 20 above 130° F. and preferably should be only such amount as to maintain the temperature within a range of 70–100° F.

In practicing the process tower 20 may be operated at a pressure which is higher, lower or substantially the same as that in the primary absorber. In contrast, the common practice of utilizing a conventional reboiler for the selective stripping operation does not permit of such wide selection of operating pressures, since the stripping must be limited to a pressure that is feasible for reboiler operation which pressure generally is considerably lower than that employed in the primary absorber. The present process has the further advantage of minimizing or avoiding polymerization of olefinic constituents that may be present in the charge gas and which tend to undergo polymerization at elevated temperatures. This prevents fouling of the absorption oil during prolonged use in the system.

I claim:

1. Method of separating a normally gaseous mixture of relatively low and high boiling hydrocarbons which comprises feeding the gaseous mixture into the lower part of an absorption tower, passing the mixture upwardly countercurrent to an absorption medium under temperature and pressure conditions adapted to absorb a major proportion of the relatively high boiling hydrocarbon, withdrawing from the upper part of the tower a portion of the low boiling hydrocarbon present in said gaseous mixture, passing the rich absorption medium from the base of said absorption tower directly to a second tower and introducing it therein at an intermediate level, passing additional absorption medium into the upper part of said second tower and downwardly therethrough, removing from the base of said second tower absorption medium containing dissolved hydrocarbon and introducing it directly into a flash zone, maintaining said flash zone under reduced pressure thereby partially vaporizing the dissolved hydrocarbon, passing the vaporized hydrocarbon directly to a compressing zone and therein compressing it to a pressure above that in said second tower, returning the compressed vapor to the lower part of the second tower to selectively strip relatively low boiling hydrocarbon from the downflowing absorption medium, withdrawing relatively low boiling hydrocarbon from the upper part of the second tower, and withdrawing absorption medium containing dissolved relatively high boiling hydrocarbon from the reboiler.

2. Method of separating methane from a gaseous mixture comprising methane and heavier hydrocarbon which comprises feeding the gaseous mixture into the lower part of an absorption tower, passing the mixture upwardly countercurrent to an absorption medium under temperature and pressure conditions adapted to absorb a major proportion of the heavier hydrocarbon, withdrawing from the upper part of the tower a portion of the methane present in said gaseous mixture, passing the rich absorption medium from the base of said absorption tower directly to a second tower and introducing it therein at an intermediate level, passing additional absorption medium into the upper part of said second tower and downwardly therethrough, removing from the base of said second tower absorption medium containing dissolved hydrocarbon and introducing it directly into a flash zone, maintaining said flash zone under reduced pressure thereby partially vaporizing the dissolved hydrocarbon, passing the vaporized hydrocarbon directly to a compressing zone and therein compressing it to a pressure above that in said second tower, returning the compressed vapor to the lower part of the second tower to selectively strip methane from the downflowing absorption medium, withdrawing methane from the upper part of the second tower, and withdrawing absorption medium containing dissolved heavier hydrocarbon from the reboiler.

3. Method of separating $C_2$ hydrocarbon from a gaseous mixture comprising $C_2$ and higher boiling hydrocarbon which comprises feeding the gaseous mixture into the lower part of an absorption tower, passing the mixture upwardly countercurrent to an absorption medium under temperature and pressure conditions adapted to absorb a major proportion of the higher boiling hydrocarbon, withdrawing from the upper part of the tower a portion of the $C_2$ hydrocarbon present in said gaseous mixture, passing the rich absorption medium from the base of said absorption tower directly to a second tower and introducing it therein at an intermediate level, passing additional absorption medium into the upper part of said second tower and downwardly therethrough, removing from the base of said second tower absorption medium containing dissolved hydrocarbon and introducing it directly into a flash zone, maintaining said flash zone under reduced pressure thereby partially vaporizing the dissolved hydrocarbon, passing the vaporized hydrocarbon directly to a compressing zone and therein compressing it to a pressure above that in said second tower, returning the compressed vapor to the lower part of the second tower to selectively strip $C_2$ hydrocarbon from the downflowing absorption medium, withdrawing $C_2$ hydrocarbon from the upper part of the second tower, and withdrawing absorption medium containing dissolved higher boiling hydrocarbon from the reboiler.

References Cited in the file of this patent

UNITED STATES PATENTS

| Number | Name | Date |
|---|---|---|
| 1,900,655 | Metzger | Mar. 7, 1933 |
| 1,953,043 | Cole et al. | Mar. 27, 1934 |
| 2,217,429 | Balcar | Oct. 8, 1940 |
| 2,325,588 | Brandt | Aug. 3, 1943 |
| 2,350,256 | Shiras et al. | May 30, 1944 |
| 2,522,059 | Ray et al. | Sept. 12, 1950 |
| 2,608,270 | McDonald Jr. et al. | Aug. 26, 1952 |
| 2,613,132 | Hutchinson | Oct. 7, 1952 |

FOREIGN PATENTS

| Number | Country | Date |
|---|---|---|
| 866,780 | France | Sept. 3, 1941 |